United States Patent [19]

Hirai

[11] Patent Number: 5,895,133
[45] Date of Patent: Apr. 20, 1999

[54] EXPOSURE MODE SELECTING DEVICE

[75] Inventor: Isamu Hirai, Tokyo, Japan

[73] Assignee: Asahi Kogaku Kogyo Kabushiki Kaisha, Tokyo, Japan

[21] Appl. No.: 08/942,356

[22] Filed: Oct. 1, 1997

[30] Foreign Application Priority Data

Oct. 25, 1996 [JP] Japan ................................. 8-301330

[51] Int. Cl.$^6$ ..................................................... G03B 7/20
[52] U.S. Cl. ........................ 396/238; 396/257; 396/298; 396/529
[58] Field of Search ................................. 396/238, 239, 396/298, 529, 257, 258, 505

[56] References Cited

U.S. PATENT DOCUMENTS

| | | |
|---|---|---|
| Re. 32,049 | 12/1985 | Okura et al. . |
| Re. 32,080 | 2/1986 | Kawasaki . |
| 4,582,412 | 4/1986 | Wakabayashi ......................... 396/238 |
| 4,853,732 | 8/1989 | Suzuki et al. . |
| 4,945,376 | 7/1990 | Kawasaki et al. . |
| 5,012,268 | 4/1991 | Hirai . |
| 5,349,409 | 9/1994 | Kawasaki et al. . |

*Primary Examiner*—W. B. Perkey
*Attorney, Agent, or Firm*—Greenblum & Bernstein, P.L.C.

[57] ABSTRACT

An exposure mode selecting device uses an A-position AE mode code, an M-position AE mode code, and a no-aperture-ring AE mode code, so that a proper exposure mode is selected. When an interchangeable lens, having an aperture ring being set to an A-position, is attached to a camera body, the A-position AE mode code is set to 0 or 1 so that a program mode or a shutter speed priority mode can be selected. If the aperture ring is set to one of the M-positions, the M-position AE mode code is set to 0, 1 or 2 so that an aperture priority mode, a manual mode or a bulb mode can be selected. When an interchangeable lens having no aperture ring is attached to the camera body, the no-aperture-ring AE mode code is set to 0, 1, 2, 3 or 4 so that the program mode, the shutter speed priority mode, the aperture priority mode, the manual mode or the bulb mode can be selected.

11 Claims, 12 Drawing Sheets

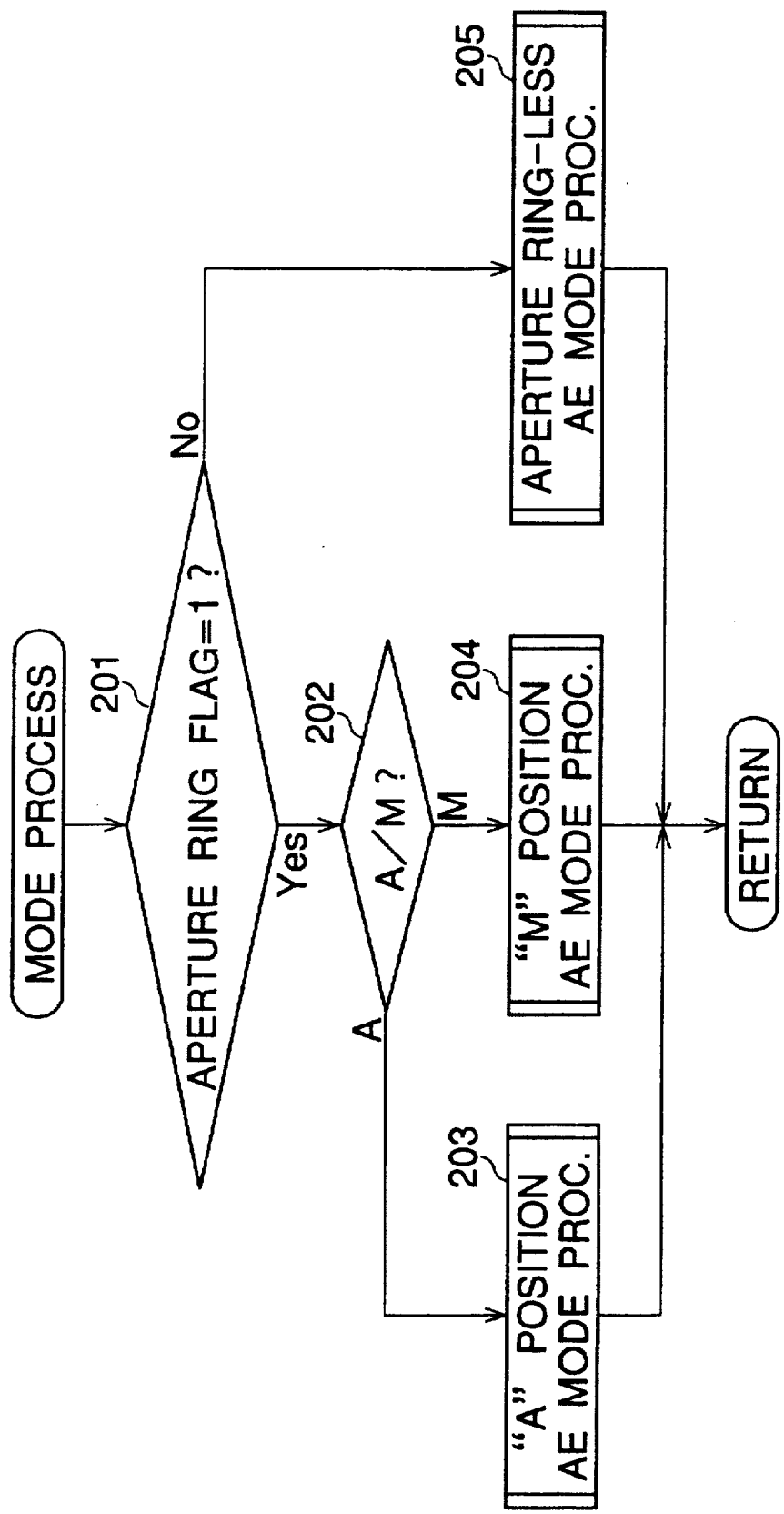

FIG. 11

| RAM CONTENTS | APERTURE RING FLAG | APERTURE RING A/M FLAG | "A" POSITION AE MODE CODE (AE(A)) | "M" POSITION AE MODE CODE (AE(M)) | NO-APERTURE-RING AE MODE CODE (AE(B)) |
|---|---|---|---|---|---|
| | 0 : WITHOUT APERTURE RING<br>1 : WITH APERTURE RING | 0 : A<br>1 : M | 0 : PROGRAM MODE<br>1 : Tv PRIORITY MODE | 0 : Av PRIORITY MODE<br>1 : MANUAL MODE<br>2 : BULB MODE | 0 : PROGRAM MODE<br>1 : Tv PRIORITY MODE<br>2 : Av PRIORITY MODE<br>3 : MANUAL MODE<br>4 : BULB MODE |

EXPOSURE MODE SELECTING DEVICE

BACKGROUND OF THE INVENTION

1. Field of the Invention

The present invention relates to a camera in which a detachable, interchangeable lens is attached to the camera body, and more particularly to a device for selecting an exposure mode for the camera.

2. Description of the Related Art

Conventionally, there are two kinds of interchangeable lenses, i.e., a first interchangeable lens and a second interchangeable lens. The first interchangeable lens has an aperture ring which can be set to an A-position, corresponding to an automatic setting mode in which an aperture value is automatically set from the camera body, and to M-positions, corresponding to a manual setting mode in which the aperture value is manually set. Namely, while the A-position is singular, there are a plurality of M-positions in which one of the numerals, which are formed on the aperture ring to indicate aperture values, is aligned with a mark formed on a surface of the lens barrel. The second interchangeable lens does not have such an aperture ring.

In a camera system in which the first interchangeable lens is used, in accordance with an operation of a control circuit provided in the camera body, a photographing operation can be carried out in a program mode or a shutter speed priority mode when the aperture ring is set to the A-position, and can be carried out in an aperture priority mode, a manual mode, or a bulb mode when the aperture ring is set to one of the M-positions. The camera system can be constructed to enable the aperture priority mode, the manual mode or the bulb mode to be selected, even when the aperture ring is set to the A-position. In this construction, however, because the aperture priority mode, the manual mode or the bulb mode can now be selected in both of the cases in which the aperture ring is set to the A-position or one of the M-positions, an operation of the mode selection becomes complicated. Therefore, usually, the camera is constructed so the selecting of the aperture priority mode, the manual mode and the bulb mode is prohibited when the aperture ring is set to the A-position.

Conversely, in a camera system in which the second interchangeable lens is used, in accordance with an operation of a control circuit provided in the camera body, a photographing operation can be carried out in the program mode, the shutter speed priority mode, the aperture priority mode, the manual mode, or the bulb mode. In this camera system, a setting device, by which these modes are set, is not provided in the interchangeable lens, but both of the setting operations, in which one of the modes is selected, and the aperture value are set by a setting device provided in the camera body.

If the second interchangeable lens is attached to a camera body of a camera system, which was originally designed for using the first interchangeable lens, the control circuit provided in the camera body automatically assumes that the aperture ring is set to the A-position. Accordingly, in this camera system, there is a problem in which the aperture priority mode, the manual mode and the bulb mode are not available for selection. Conversely, if the first interchangeable lens is attached to a camera body of a camera system, which was originally designed for using the second interchangeable lens, then the aperture priority mode, the manual mode and the bulb mode can be selected when either the aperture ring is set to the A-position or one of the M-positions, which has a different aperture value setting operation than the A-position; thus both aperture value setting operations are complicated.

SUMMARY OF THE INVENTION

Therefore, an object of the invention is to provide an exposure mode selecting device by which a mode, such as the aperture priority mode, the manual mode and the bulb mode, in which the aperture is to be manually adjusted, can be selected even when the second interchangeable lens is attached to a camera body of a camera system originally designed to use the first interchangeable lens. A further object of the present invention is to provide an exposure mode selecting device in which the complexity of the setting operation is simplified, so that the aperture priority mode, the manual mode and the bulb mode can be selected in both the A-position and any one of the M-positions, when the first interchangeable lens is attached to the camera body of a camera system originally designed to use the second interchangeable lens.

According to the present invention, there is provided an exposure mode selecting device for selecting one of a plurality of exposure modes for a camera having a camera body to which a first and a second interchangeable lens can be selectively attached. The first interchangeable lens has an aperture setting member for selecting either an automatic setting mode, in which an aperture value is automatically set from the camera body, or a manual setting mode, in which the aperture value is set by handling an operating member provided on the first interchangeable lens. The second interchangeable lens does not have the aperture setting member. The selecting device comprises a memory and a selecting processor.

The memory is mounted in the camera body, to store lens information related to the first or second interchangeable lens which is being attached to the camera body. The selecting processor selects one of the exposure modes. The number of the exposure modes, which can be selected by the selecting processor, is changed in accordance with the lens information.

Optionally, the lens information comprises aperture setting member information indicating whether the aperture lens which is being attached to the camera body. In another embodiment, the lens information comprises aperture mode information indicating whether the automatic setting mode or the manual setting mode is set.

In another embodiment, the number of the exposure modes which can be selected by the selecting processor is less when the first interchangeable lens is attached to the camera body and either the automatic setting mode or the manual setting mode is selected, than when the second interchangeable lens is attached to the camera body. Optionally, a sum of the number of the exposure modes which can be selected by the selecting processor when the first interchangeable lens is attached to the camera body and the automatic setting mode is selected, and the number of the exposure modes when the manual setting mode is selected, is equal to a number of the exposure modes which can be selected by the selecting processor when the second interchangeable lens is attached to the camera body.

In another embodiment, the aperture setting member is an aperture ring rotatably fitted to an outer surface of the first interchangeable lens. In another embodiment, the aperture setting member is the operating member used in the automatic setting mode.

Further, according to the present invention, there is provided a camera system comprising a camera body, a first interchangeable lens, a second interchangeable lens, a first memory and a selecting processor.

The first interchangeable lens has an aperture setting member for selecting either an automatic setting mode, or a manual setting mode. In the automatic setting mode, aperture value is automatically set from a camera body. In the manual setting mode, the aperture value is set by handling an operating member provided on the first interchangeable lens. The first interchangeable lens can be attached to the camera body. The second interchangeable lens does not have the aperture setting member. The second interchangeable lens can be attached to the camera body. The first memory is mounted in the camera body, to store lens information related to the first or second interchangeable lens which is being attached to the camera body. The selecting processor selects one of a plurality of exposure modes. The number of the exposure modes, which can be selected by the selecting processor, is changed in accordance with the lens information.

BRIEF DESCRIPTION OF THE DRAWINGS

The present invention will be better understood from the description of the preferred embodiments of the invention set forth below, together with the accompanying drawings, in which:

FIG. 6 is a flow chart of a mode process;

FIG. 11 is a table indicating a code and a flag stored in a RAM;

DESCRIPTION OF THE PREFERRED EMBODIMENTS

Figure 1:
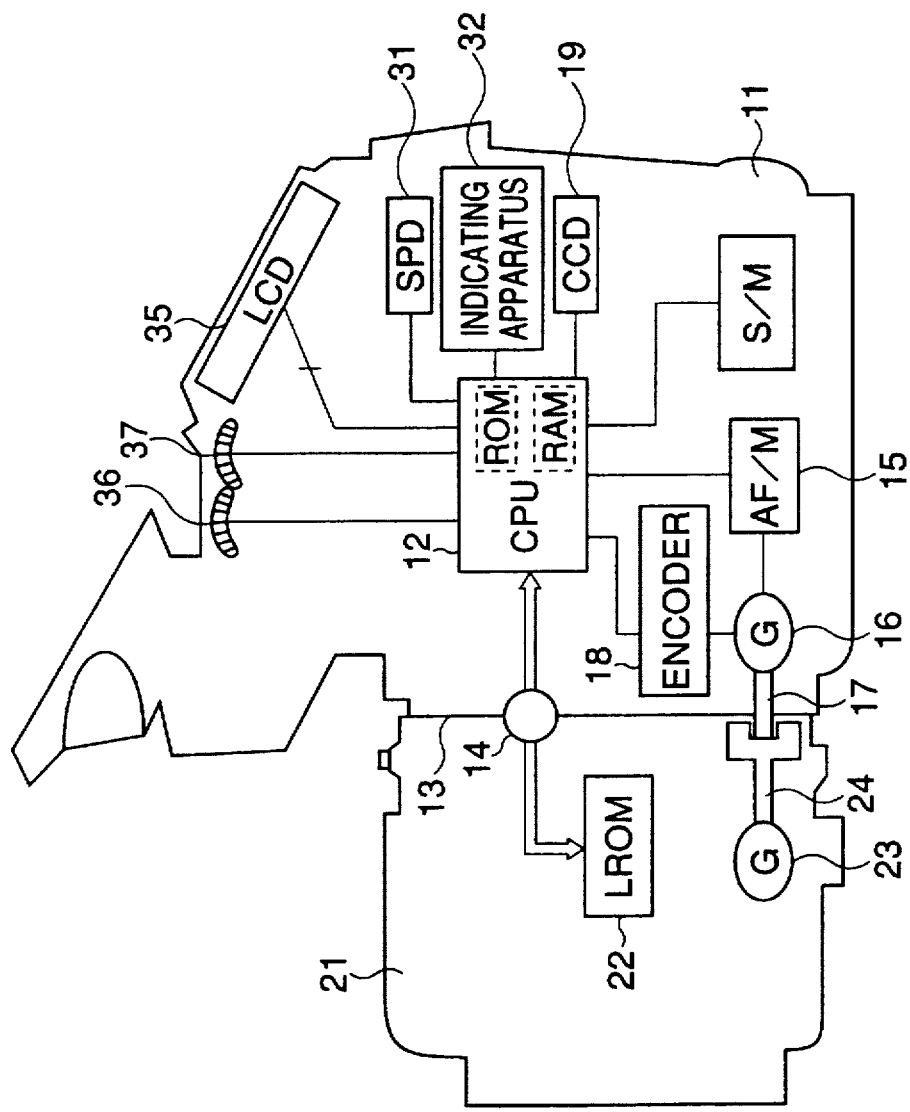
FIG. 1 is a block diagram showing a single reflex camera to which an embodiment of the present invention is applied.

The present invention will be described below with reference to embodiments shown in the drawings.

Figure 2:
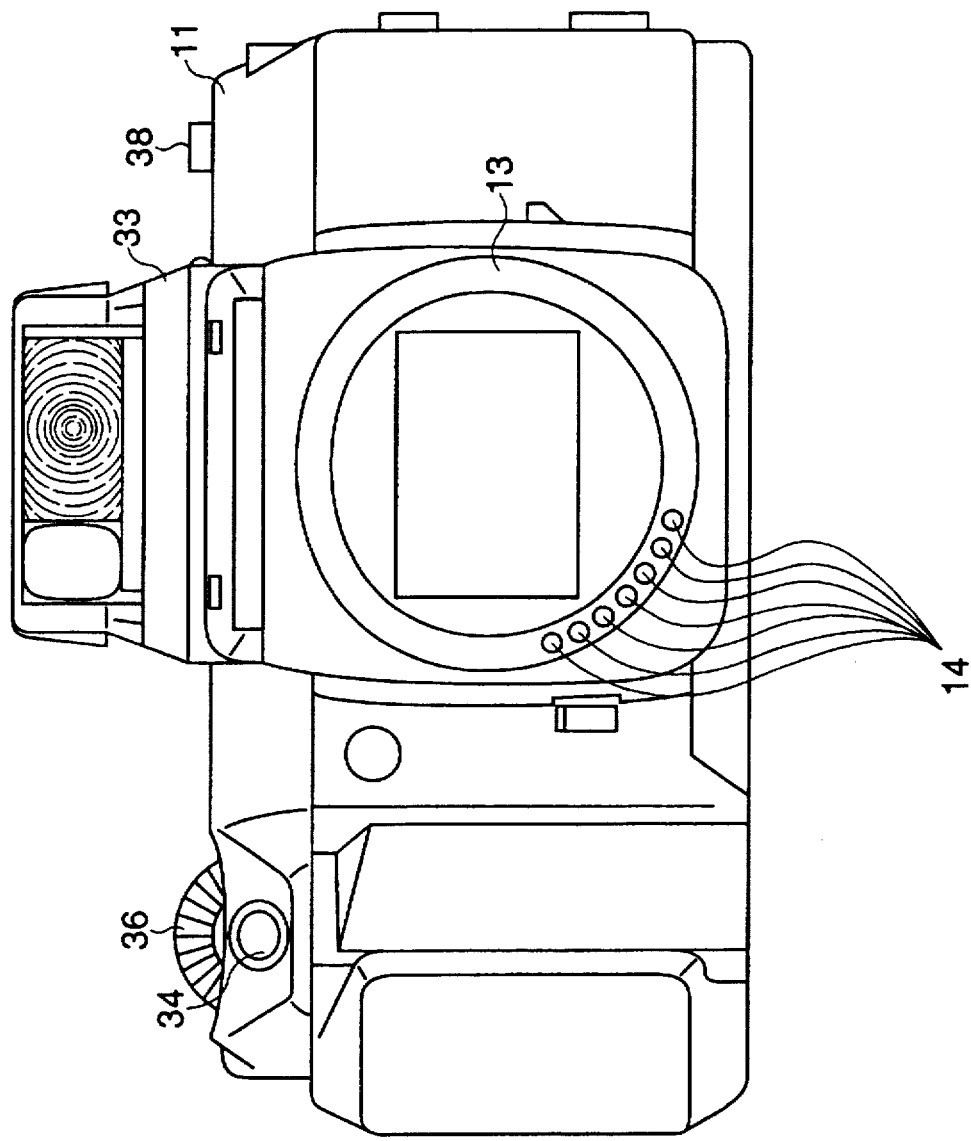
FIG. 2 is a front view showing the camera shown in FIG. 1, in which an interchangeable lens has been removed.
Figure 3:
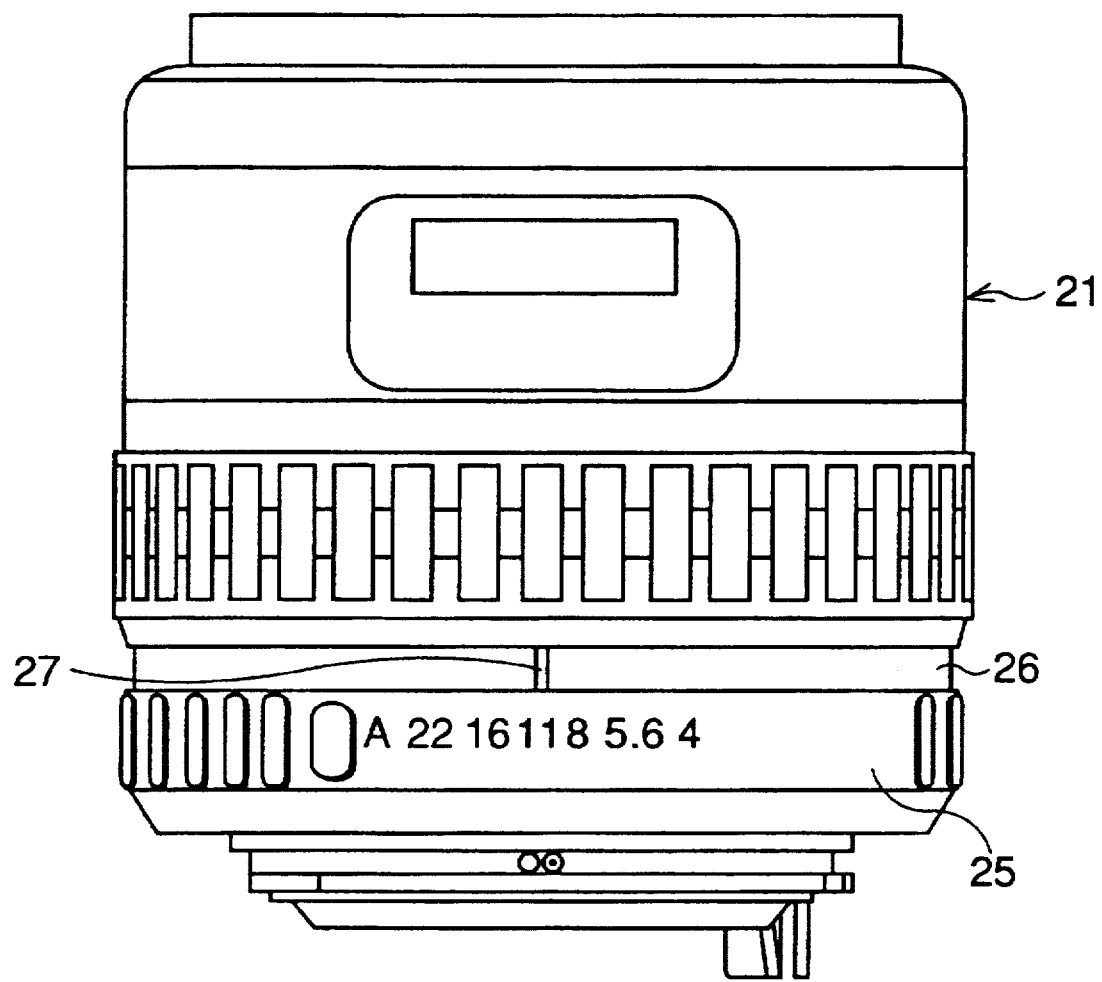
FIG. 3 is a plane view showing a first interchangeable lens having an aperture ring.
Figure 4:
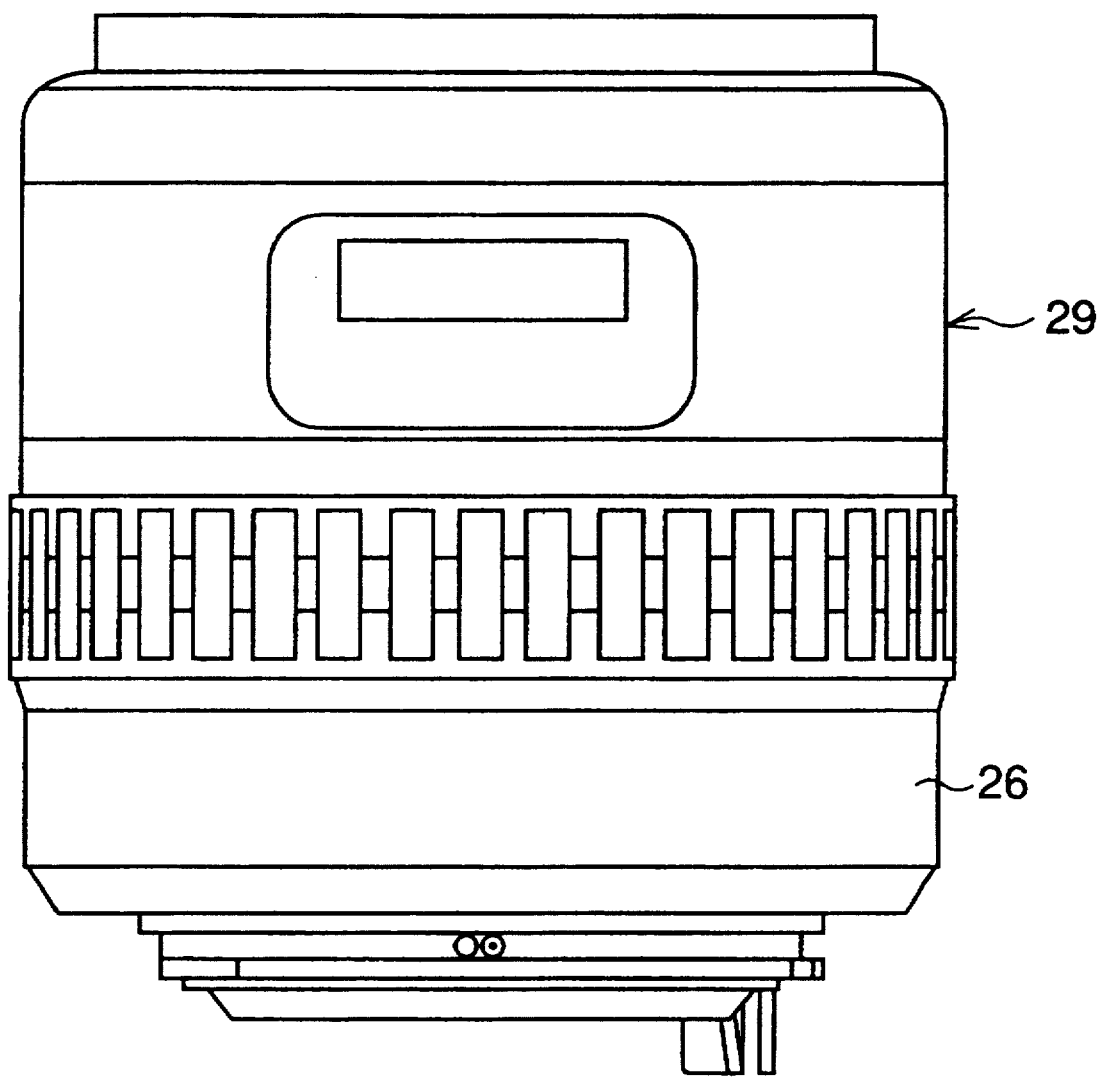
FIG. 4 is a plane view showing a second interchangeable lens having no aperture ring.

FIG. 1 shows a single reflex camera to which an embodiment of the present invention is applied. FIG. 2 shows the camera, shown in FIG. 1, in which an interchangeable lens has been removed. FIGS. 3 and 4 show a first interchangeable lens having an aperture ring and a second interchangeable lens having no aperture ring, respectively.

The camera system has a camera body 11, to which either the first interchangeable lens 21, which is provided with the aperture ring 25 rotatable around a lens barrel 26, or the second interchangeable lens 29 can be selectively attached. The aperture ring 25, of the first interchangeable lens 21, is used for selecting either an automatic setting mode, in which an aperture value is automatically set from the camera body 11, or a manual setting mode, in which the aperture value is manually set by rotating the aperture ring 25. A positioning mark 27 is formed on the surface of the lens barrel 26 of the first interchangeable lens 21. The aperture ring 25 can be set to an A-position, corresponding to the automatic setting mode, by setting the mark "A" to the positioning mark 27. The aperture ring 25 can be set to one of a plurality of M-positions, corresponding to the manual setting mode, by setting a numeral such as "11", which indicates an aperture value, to the positioning mark 27. Namely, the number of M-positions is equal to a number of aperture values which can be set by the aperture ring 25.

A control circuit 12, which includes a computer having a ROM and a RAM, is mounted in the camera body 11. A program for controlling an operation of the camera system is stored in the ROM, and various kinds of data are temporarily stored in the RAM. A lens ROM 22 is mounted in the interchangeable lens 21, which is attached to a mount 13 of the camera body 11. Information, such as a focal length of the lens, an f-number of a maximum aperture, a position of the exit pupil and a presence of an aperture ring, is stored in the lens ROM 22. Communication between the control circuit 12 and the lens ROM 22 is carried out through mount contacts 14 provided on the mount 13. The mount contacts 14 are provided around the periphery of the mount 13.

Lens groups (not shown) mounted in the interchangeable lens 21 are moved along the optical axis by a rotation of a gear 23, so that a focusing operation is performed. A first connecting shaft 24 is connected to the gear 23, and is extended toward the mount 13. A second connecting shaft 17 is connected to a gear 16 provided on an output shaft of an AF motor 15 mounted in the camera body 11. The second connecting shaft 17 projects from the mount 13, and is connected to the first connecting shaft 24 when the interchangeable lens 21 is attached to the mount 13. In this state, the lens groups can be moved by the AF motor 15. The rotational amount of the gear 16, sensed by an encoder 18, is input into the control circuit 12. An imaging device (i.e. CCD) 19 is provided in the camera body 11 in order to perform a distance measurement. Based on the rotational amount of the gear 16 and the distance measurement data derived from an output signal of the imaging device 19, the AF motor 15 is driven so that the lens groups are moved, by a predetermined amount, along the optical axis under control of the control circuit 12.

A photo sensor (SPD) 31 is mounted in the camera body 11 to sense a brightness of an object to be photographed. A sensing signal of the photo sensor 31 is input into the control circuit 12. An indicating apparatus 32 within a viewfinder is provided in the camera body 11. The indicating apparatus 32 has a liquid crystal display for indicating a photographing condition, such as a shutter speed, in a viewfinder 33, and a photo diode for illuminating the liquid crystal display. The indicating operation of the indicating apparatus 32 is controlled by the control circuit 12.

A shutter button 34 (FIG. 2) is provided on an upper surface of the camera body 11. Photometry and distance measurement are performed by partly depressing the shutter button 34. Photography is performed by fully depressing the shutter button 34. A liquid crystal display panel (LCD) 35 is mounted on the upper surface of the camera body 11 to indicate information, such as an exposure mode, and the indicated contents are controlled by the control circuit 12.

The upper surface of the camera body 11 is provided with a Tv dial 36 for setting a shutter speed, and an Av dial 37 for setting an amount of an aperture (i.e. an aperture value). The values set by these dials 36 and 37 are inputted into the control circuit 12. The upper surface of the camera body 11 is also provided with a mode setting switch 38 (FIG. 2).

When the first interchangeable lens 21 is attached to the camera body 11, the exposure mode can be switched between the program mode and the shutter speed priority mode, by rotating the Tv dial 36 while the aperture ring 25 is set to the A-position and the mode setting switch 38 is depressed. Namely, the Tv dial 36 operates as a part of a member for switching the exposure mode. When the aperture ring 25 is set to one of the M-positions, the exposure mode can be switched between the aperture priority mode, the manual mode and the bulb mode, by a similar operation. Conversely, when the second interchangeable lens 29 is attached to the camera body 11, the exposure mode can be switched between the program mode, the shutter speed priority mode, the aperture priority mode, the manual mode and the bulb mode, also by a similar operation.

Figures 5, 12:
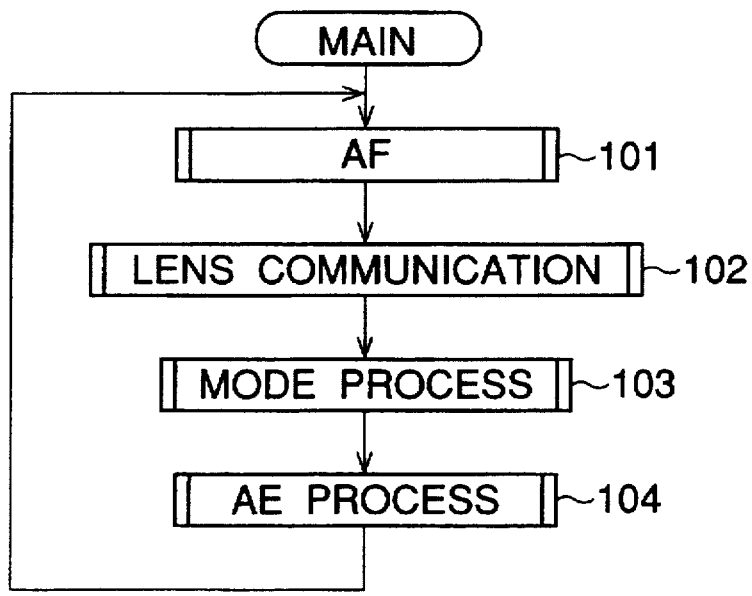
FIG. 5 is a flow chart of a main routine of a control program for carrying out a photographing operation.
FIG. 12 is a table indicating an AE mode code stored in the RAM.

FIGS. 5 though 10 are flow charts of control programs for carrying out a photographing operation. With reference to these drawings, an operation of the embodiment will be described below.

FIG. 5 is a flow chart of a main routine.

In Step 101, based on the distance measurement data obtained from the output signal of the imaging device 19 and a rotational amount of the gear 16, the AF motor 15 is driven so that an automatic focusing adjustment (AF) is performed. In Step 102, a lens communication is performed between the interchangeable lens and the camera body 11. Namely, first lens information (such as aperture setting member information) indicating the presence of the aperture ring, second lens information (such as aperture mode information) indicating the set position of the aperture ring, and information inherent to the lens, such as a focal length, an f-number of a maximum aperture, and a position of the exit pupil, which is stored in the lens ROM 22, is transmitted to the camera body 11 and stored in the ROM provided in the control circuit 12.

Figure 10:
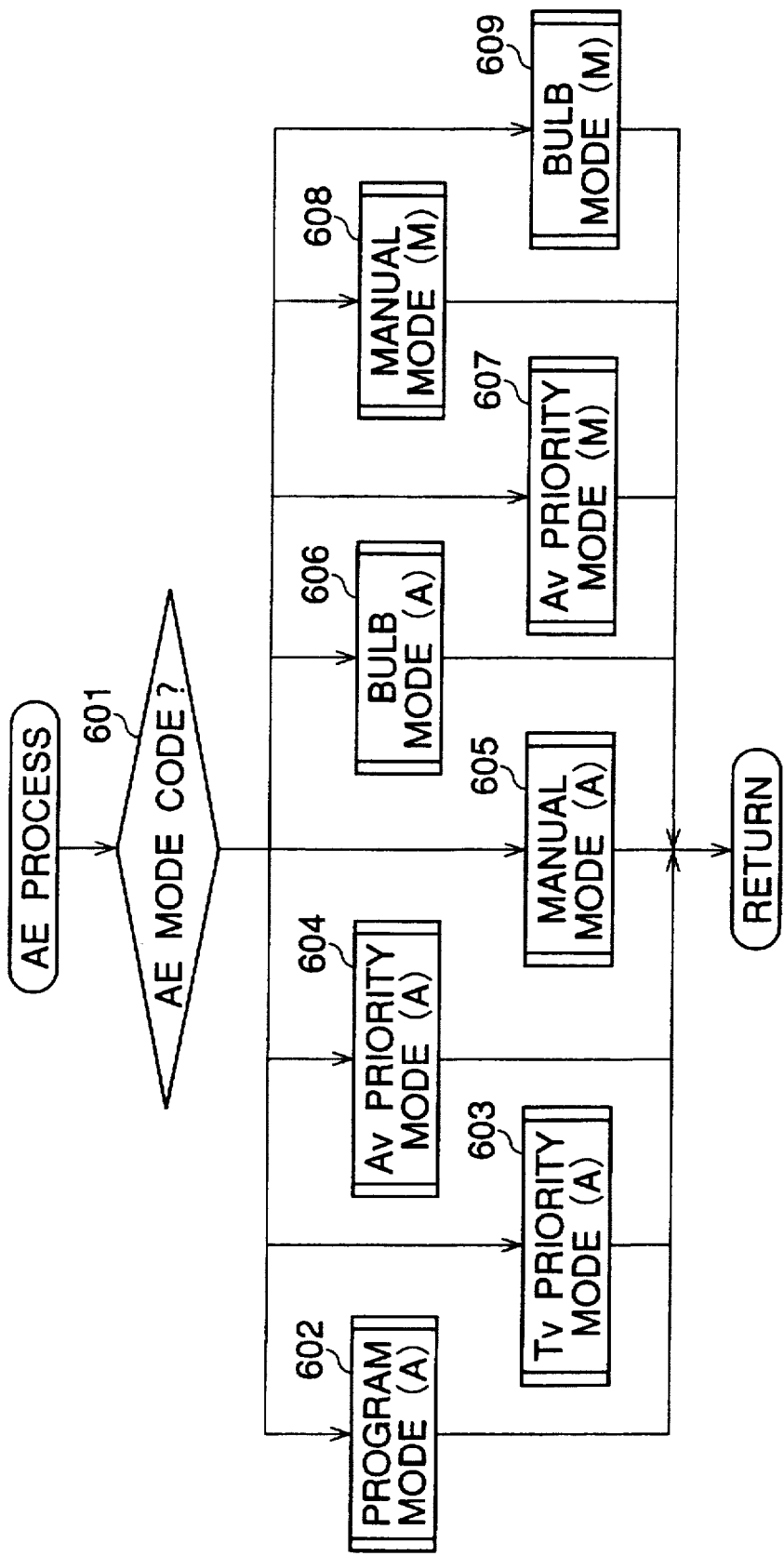
FIG. 10 is a flow chart of an exposure process.

In Step 103, a mode process, a flow chart of which is shown in FIG. 6, is carried out, so that the exposure mode, such as the program mode, for example, is selected. In Step 104, an automatic exposure (AE) process, a flow chart of which is shown in FIG. 10, is carried out, so that photography is performed in accordance with the exposure mode set in Step 103. Then, the process returns to Step 101.

FIG. 6 is a flow chart of the mode process carried out in Step 103 of the main routine.

In Step 201, it is determined whether or not an aperture ring flag, which is stored in the RAM of the control circuit 12 by the execution of Step 102 of the main routine, is 1. As shown in FIG. 11, the aperture ring flag is 0 when the interchangeable lens attached to the camera body 11 does not have an aperture ring. The aperture ring flag is 1 when the interchangeable lens does have an aperture ring.

When the aperture ring flag is 1, Step 202 is executed so that, based on an aperture ring A/M flag stored in the RAM of the control circuit 12, it is determined whether the aperture ring of the interchangeable lens is set to the A-position or one of the M-positions. As shown in FIG. 11, the aperture ring A/M flag is 0 when the aperture ring is set to the A-position, and is 1 when the aperture ring is set to one of the M-positions.

When the aperture ring is set to the A-position, Step 203 is executed so that an A-position AE mode process (FIG. 7) is performed, and when the aperture ring is set to one of the M-positions, Step 204 is executed so that an M-position AE mode process (FIG. 8) is performed. Conversely, when it is determined in Step 201 that the aperture ring flag is 0, i.e. when the interchangeable lens does not have an aperture ring, Step 205 is executed so that a no-aperture-ring AE mode process (FIG. 8) is performed.

Figure 7:
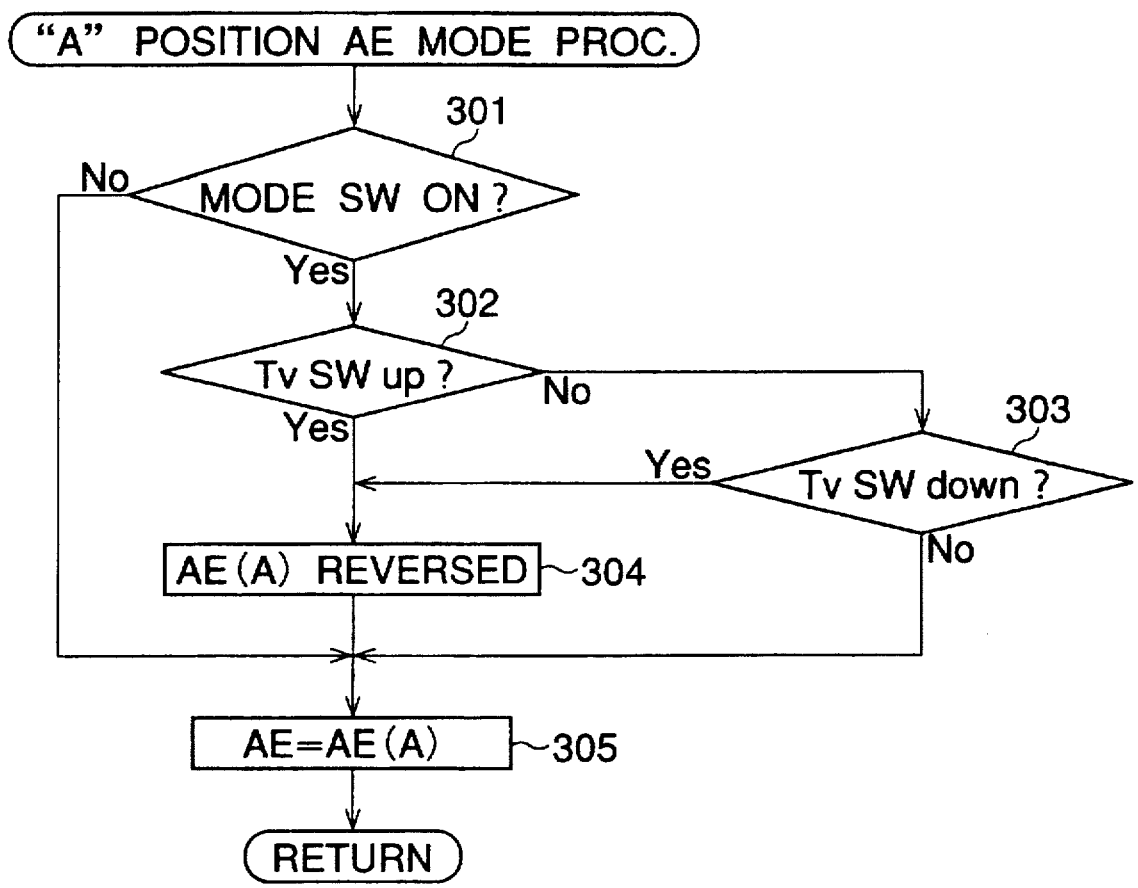
FIG. 7 is a flow chart of an A-position AE mode process.

FIG. 7 is a flow chart of the A-position AE mode process. This process is executed, as described above, when the interchangeable lens attached to the camera body 11 has the aperture ring 25 which is set to the A-position. Before this process is executed, the AE mode code (AE) value which was set in the previous execution is stored as an A-position AE mode code (AE(A)) (shown in FIG. 11). The A-position AE mode code (AE(A)) indicates the program mode when the code is 0, and indicates the shutter speed priority mode when the code is 1.

When it is determined in Step 301 that the mode setting switch 38 is turned ON, Step 302 is executed, so that it is determined whether or not the Tv dial 36 has been operated in the up-direction in which the value set by the Tv dial 36 is increased. When the Tv dial 36 has not been operated in the up-direction, Step 303 is executed, so that it is determined whether or not the Tv dial 36 has been operated in the down-direction in which the value set by the Tv dial 36 is decreased. When the Tv dial 36 has been operated in the up-direction or the down-direction, Step 304 is executed in which the previously set value of the A-position AE mode code (AE(A)) is reversed. Namely, if the A-position AE mode code (AE(A)) has been set to 1, for example, the value of the A-position AE mode code (AE(A)) is now changed to 0.

When it is determined in Step 301 that the mode setting switch 38 is turned OFF, or after Steps 302, 303 and 304 are executed, Step 305 is executed in which the A-position AE mode code (AE (A)), resulting from the previous Steps, is converted to an AE mode code (AE). As shown in FIG. 12, the AE mode code indicates the program mode when the AE mode code is 0, and indicates the shutter speed priority mode when the AE mode code is 1.

Note that, in FIG. 12, reference "A" indicates that the exposure mode is a mode which is set using the Tv dial 36 while the aperture ring 25 of the interchangeable lens 21 is set to the A-position, or is a mode which is set using the Tv dial 36, in which the interchangeable lens does not have an aperture ring. Reference "M" indicates that the exposure mode is a mode which is selected while the aperture ring 25 of the interchangeable lens 21 is set to one of the M-positions.

Figure 8:
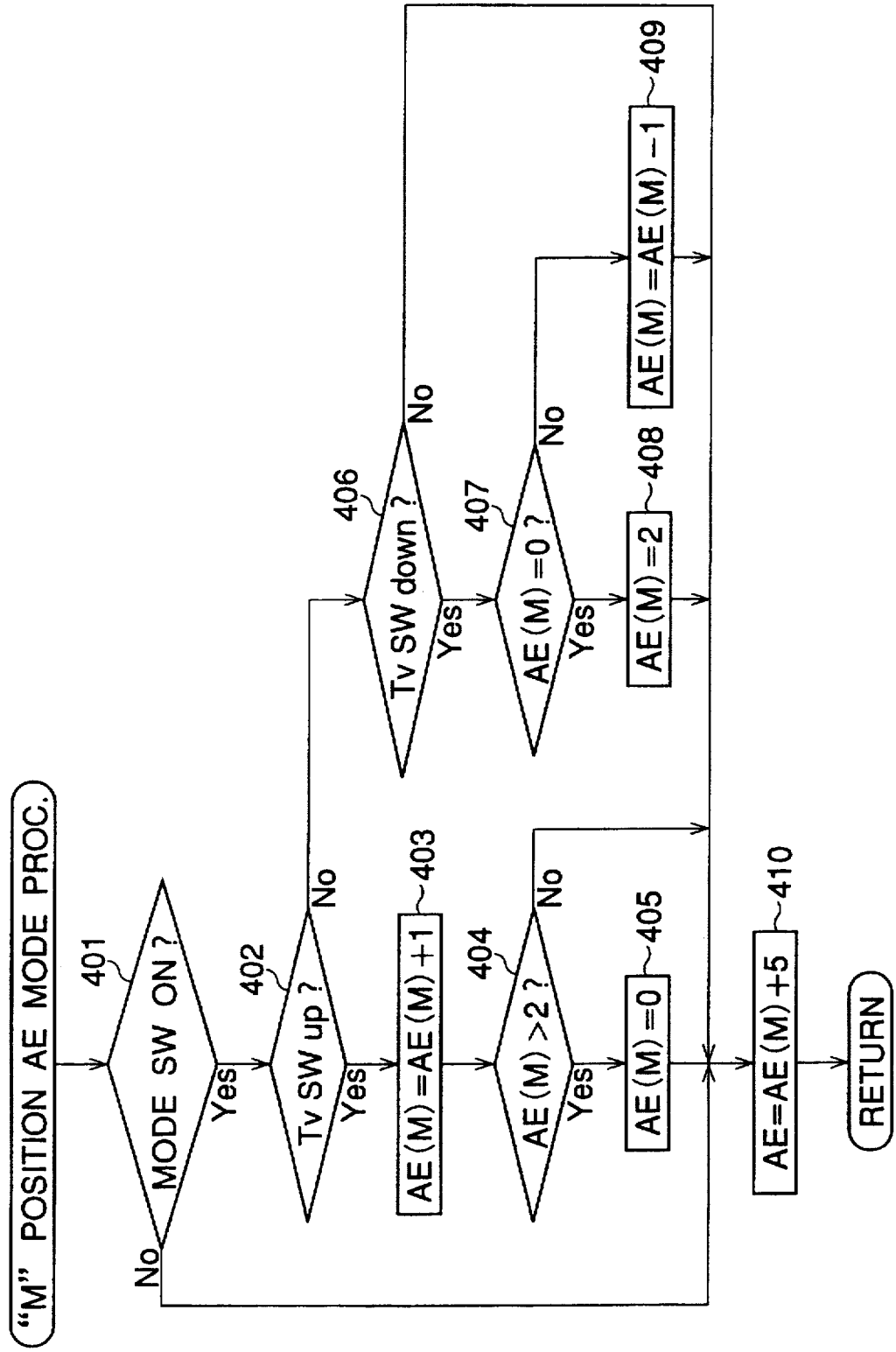
FIG. 8 is a flow chart of an M-position AE mode process.

FIG. 8 is a flow chart of the M-position AE mode process. This process is executed, as described above, when the interchangeable lens attached to the camera body 11 has the aperture ring 25 which is set to one of the M-positions. Before this process is executed, the AE mode code (AE) value which was set in the previous execution is stored as an M-position AE mode code (AE(M)) (shown in FIG. 11). The M-position AE mode code (AE(M)) indicates the aperture priority mode when the code is 0, the manual mode when the code is 1, and the bulb mode when the code is 2.

When it is determined in Step 401 that the mode setting switch 38 is turned ON, Step 402 is executed, so that it is determined whether or not the Tv dial 36 has been operated in the up-direction. When the Tv dial 36 has been operated in the up-direction, Step 403 is executed in which the M-position AE mode code (AE(M)) is incremented by 1. In Step 404, it is determined whether or not the M-position AE mode code exceeds 2. When the M-position AE mode code exceeds 2, Step 405 is executed in which the M-position AE mode code (AE(M)) is reset to 0. When the M-position AE mode code (AE(M)) does not exceed 2, Step 405 is skipped.

When it is determined in Step 402 that the Tv dial 36 has not been operated in the up-direction, Step 406 is executed in which it is determined whether or not the Tv dial 36 has been operated in the down-direction. When the Tv dial 36 has been operated in the down-direction, Step 407 is executed in which it is determined whether or not the M-position AE mode code (AE(M)) is 0. When the M-position AE mode code (AE(M)) is 0, Step 408 is executed in which the M-position AE mode code (AE(M)) is set to 2. When the M-position AE mode code (AE(M)) is not 0, Step 409 is executed in which the M-position AE mode code (AE(M)) is decremented by 1.

After Steps 405, 408 and 409 are executed, or when it is determined in Step 401 that the mode setting switch 38 has been turned OFF, or when it is determined in Step 404 that the M-position AE mode code (AE(M)) does not exceed 2, or when it is determined in Step 406 that the Tv dial 36 has not been operated in the down-direction, Step 410 is executed. Namely, 5 is added to the M-position AE mode code (AE(M)) so that the M-position AE mode code (AE(M)) is converted into the AE mode code (AE). As shown in FIG. 12, the AE mode code indicates the aperture priority mode when the AE mode code is 5, the manual mode when the AE mode code is 6, and the bulb mode when the AE mode code is 7.

Figure 9:
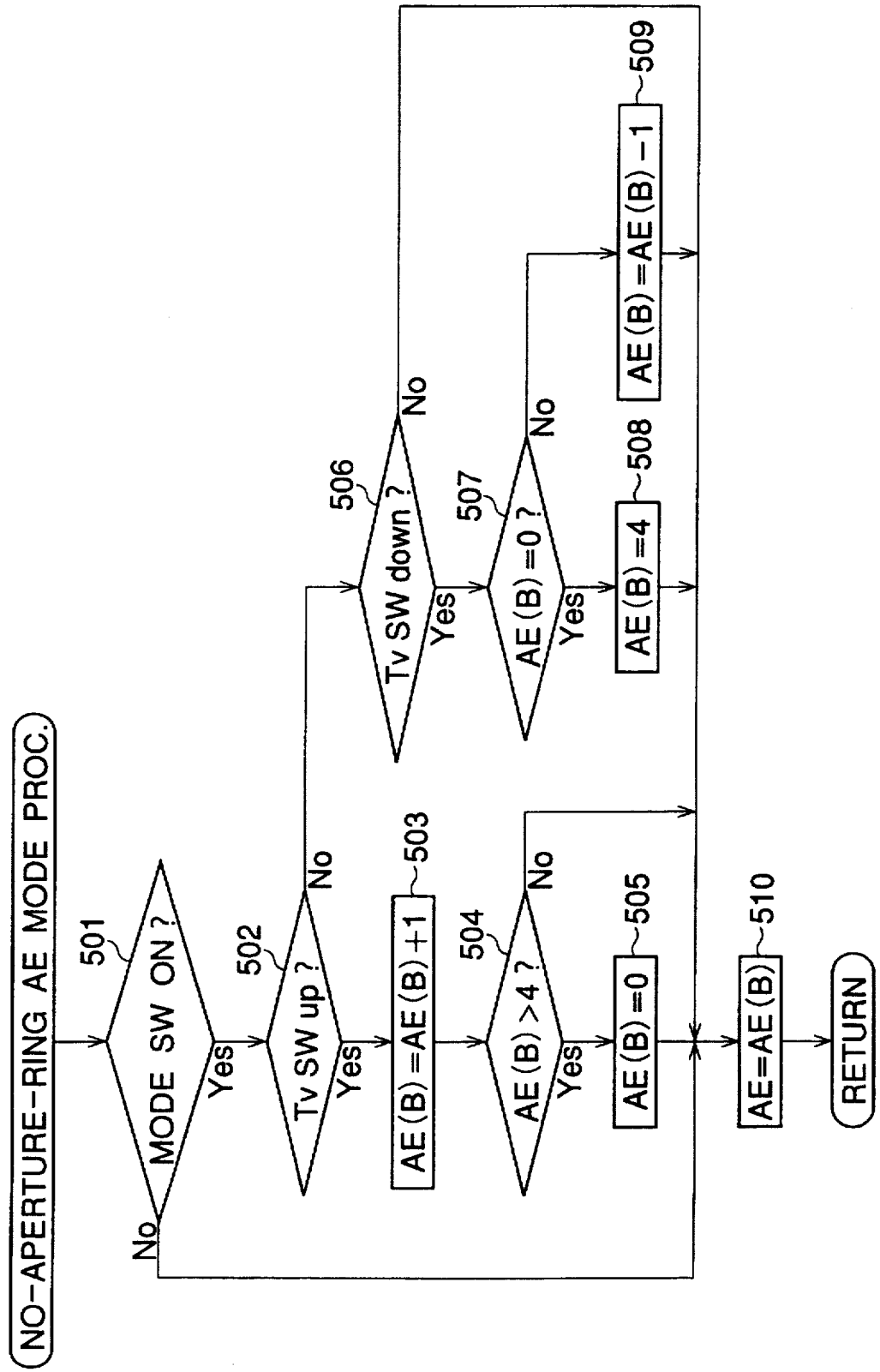
FIG. 9 is a flow chart of a no-aperture-ring AE mode process.

FIG. 9 is a flow chart of the no-aperture-ring AE mode process. This process is executed, as described above, when the interchangeable lens attached to the camera body 11 has no aperture ring. Before this process is executed, the AE mode code (AE) value which was set in the previous execution is stored as a no-aperture-ring AE mode code (AE(B)), shown in FIG. 11. The no-aperture-ring AE mode code (AE (B)) indicates the program mode when the code is 0, the shutter speed priority mode when the code is 1, the aperture priority mode when the code is 2, the manual mode when the code is 3, and the bulb mode when the code is 4.

When it is determined in Step 501 that the mode setting switch 38 is turned ON, Step 502 is executed, so that it is determined whether or not the Tv dial 36 has been operated in the up-direction. When the Tv dial 36 has been operated in the up-direction, Step 503 is executed in which the no-aperture-ring AE mode code (AE(B)) is incremented by 1. In Step 504, it is determined whether or not the no-aperture-ring AE mode code exceeds 4. When the no-aperture-ring AE mode code exceeds 4, Step 505 is executed in which the no-aperture-ring AE mode code (AE(B)) is reset to 0, and when the no-aperture-ring AE mode code (AE(B)) does not exceed 4, Step 505 is skipped.

When it is determined in Step 502 that the Tv dial 36 has not been operated in the up-direction, Step 506 is executed in which it is determined whether or not the Tv dial 36 has been operated in the down-direction. When the Tv dial 36 has been operated in the down-direction, Step 507 is executed in which it is determined whether or not the no-aperture-ring AE mode code (AE(B)) is 0. When the no-aperture-ring AE mode code (AE(B)) is 0, Step 508 is executed in which the no-aperture-ring AE mode code (AE(B)) is set to 4. When the no-aperture-ring AE mode code (AE(B)) is not 0, Step 509 is executed in which the no-aperture-ring AE mode code (AE(B)) is decremented by 1.

After Steps 505, 508 and 509 are executed, or when it is determined in Step 501 that the mode setting switch 38 has been turned OFF, or when it is determined in Step 504 that the no-aperture-ring AE mode code (AE(B)) does not exceed 4, or when it is determined in Step 506 that the Tv dial 36 has not been operated in the down-direction, Step 510 is executed. Namely, the no-aperture-ring AE mode code (AE (B)), resulting from the previous Steps, is converted to the AE mode code. As shown in FIG. 12, the AE mode code indicates the program mode, the shutter speed priority mode, the aperture priority mode, the manual mode and the bulb mode when the AE mode code is 0, 1, 2, 3 and 4, respectively.

FIG. 10 is a flow chart of the exposure process executed in Step 104 of the main routine. In Step 601, the value of the AE mode code (AE) shown in FIG. 12 is checked. When the AE mode code (AE) is 0, 1, 2, 3, 4, 5, 6 or 7, the respective Step 602, 603, 604, 605, 606, 607, 608 or 609 is executed, so that photography is carried out according to the program mode (A), the shutter speed priority mode (A), the aperture priority mode (A), the manual mode (A), the bulb mode (A), the aperture priority mode (M), the manual mode (M), or the bulb mode (M).

In the program mode (A), the aperture value and the shutter speed are automatically set by the control circuit 12 provided in the camera body 11. In the shutter speed priority mode (A), the aperture value is automatically set by the control circuit 12 and the shutter speed is set by the Tv dial 36. In the aperture priority mode (A), the aperture value is set by the Av dial 37 and the shutter speed is automatically set by the control circuit 12. In the manual mode (A), the aperture is set by the Av dial 37 and the shutter speed is set by the Tv dial 36. In the bulb mode (A), the aperture value is set by the Av dial 37 and the shutter speed is not set. In the aperture priority mode (M), the aperture value is set by the aperture ring 25 and the shutter speed is automatically set by the control circuit 12. In the manual mode (M), the aperture value is set by the aperture ring 25 and the shutter speed is set by the Tv dial 36. In the bulb mode (M), the aperture value is set by the aperture ring 25 and the shutter speed is not set.

Figure 13:
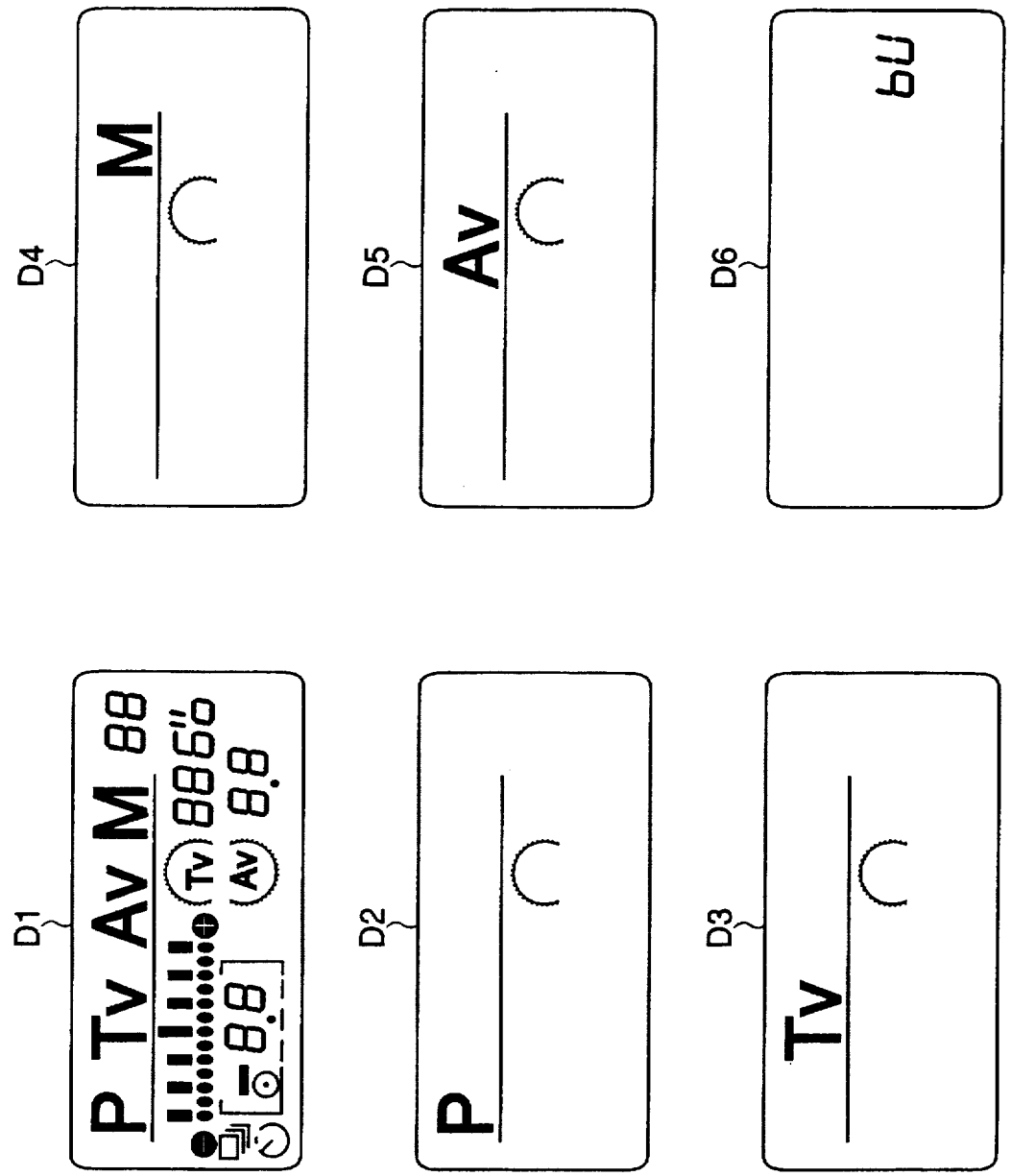
FIG. 13 is a view showing examples of indications on a liquid crystal display.

FIG. 13 shows examples of indications on the liquid crystal display 13. Reference D1 shows all of the letters and marks indicated by the liquid crystal display panel 35. References D2, D3, D4, D5 and D6 show indications corresponding to the program mode, the shutter speed priority mode, the manual mode, the aperture priority mode and the bulb mode, respectively. These indications are changed in accordance with the contents of the RAM of the control circuit 12, i.e. these indications are changed by rotating the Tv dial 36 while depressing the mode setting switch 38.

As described above, in the embodiment, when the interchangeable lens 21 attached to the camera body 11 has an aperture ring 25, the exposure mode is selected as follows. Namely, if the aperture ring is set to the A-position, the exposure mode is switched between the program mode and the shutter speed priority mode by clicking the Tv dial 36 while depressing the mode setting switch 38. If the aperture ring is set to one of the M-positions, the exposure mode can be switched between the aperture priority mode, the manual mode and the bulb mode by clicking the Tv dial 36 while depressing the mode setting switch 38. Conversely, when the interchangeable lens does not have an aperture ring, the exposure mode can be switched between the program mode, the shutter speed priority mode, the aperture priority mode, the manual mode and the bulb mode.

Therefore, according to the embodiment, even when an interchangeable lens having no aperture ring is attached to a camera body of a camera system originally designed for using an interchangeable lens having an aperture ring, a mode such as the aperture priority mode, the manual mode and the bulb mode, in which an aperture is usually manually set, can be selected. Further, even when an interchangeable lens, which has an aperture ring, is attached to a camera body of a camera system which was originally designed for using an interchangeable lens having no aperture ring, the aperture priority mode or the manual mode can be selected even when the aperture ring is set to the A-position or one of the M-positions. Thus, the selecting operation becomes simple.

In the embodiment, a number of the exposure modes which can be selected through the Tv dial 36 is changed in accordance with the lens information read from the lens ROM 22, i.e. the information such as the provision of an aperture ring. Namely, the procedure is now simplified such that when the interchangeable lens 21 has an aperture ring which is set to the A-position, the Tv dial 36 need only be rotated between two positions; if the aperture ring is set to one of the M-positions, the Tv dial 36 need only be rotated between three settings; and when the interchangeable lens is not provided with an aperture ring, the Tv dial 36 need only be operated between five positions. Therefore, when the exposure mode is set, the Tv dial 36 need only be rotated over the set limit (i.e. 2, 3 or 5 positions). Thus the setting operation of the exposure mode can be accomplished in a shorter time.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-301330 (filed on Oct. 25, 1996) which is expressly incorporated herein by reference, in its entirety.

I claim:

1. A device for selecting one of a plurality of exposure modes for a camera having a camera body to which a first and a second interchangeable lens can be selectively attached, said first interchangeable lens having an aperture setting member for selecting one of an automatic setting mode, in which an aperture value is automatically set from said camera body, and a manual setting mode, in which said aperture value is set by operating an operating member provided on said first interchangeable lens, said second interchangeable lens having an automatic aperture control capability, but not having said aperture setting member, said selecting device comprising:

a memory mounted in said camera body, to store lens information related to said first and second interchangeable lens attached to said camera body; and a selecting processor for selecting one of said exposure modes;

wherein a number of said exposure modes, which can be selected by said selecting processor, is changed in accordance with said lens information.

2. The device according to claim 1, wherein said lens information comprises aperture setting member information indicating whether said aperture setting member is provided on said first or second interchangeable lens (which is being) attached to said camera body.

3. The device according to claim 1, wherein said lens information comprises aperture mode information indicating whether one of said automatic setting mode and said manual setting mode is set.

4. The device according to claim 1, wherein said number of said exposure modes which can be selected by said selecting processor is less when said first interchangeable lens is attached to said camera body and one of said automatic setting mode and said manual setting mode is selected, than when said second interchangeable lens is attached to said camera body.

5. The device according to claim 1, wherein a sum of said number of said exposure modes which can be selected by said selecting processor when said first interchangeable lens is attached to said camera body and said automatic setting mode is selected, and said number of said exposure modes which can be selected by said selecting processor when said first interchangeable lens is attached to said camera body and said manual setting mode is selected, is equal to a number of said exposure modes which can be selected by said selecting processor when said second interchangeable lens is attached to said camera body.

6. The device according to claim 1, wherein said aperture setting member is an aperture ring rotatably fitted to an outer surface of said first interchangeable lens.

7. The device according to claim 1, wherein said aperture setting member comprise said operating member used in said manual setting mode.

8. A camera system comprising:

a camera body;

a first interchangeable lens having an aperture setting member for selecting one of an automatic setting mode, in which an aperture value is automatically set from a camera body, and a manual setting mode, in which said aperture value is set by an operating member provided on said first interchangeable lens, said first interchangeable lens being able to be attached to said camera body;

a second interchangeable lens not having said aperture setting member, said second interchangeable lens being able to be attached to said camera body and having an automatic aperture control capability;

a first memory mounted in said camera body, to store lens information related to said first and second interchangeable lens attached to said camera body; and a selecting processor for selecting one of a plurality of exposure modes;

wherein a number of said exposure modes, which can be selected by said selecting processor, is changed in accordance with said lens information.

9. The device according to claim 8, wherein said one of said first or second interchangeable lens attached to said camera body has a second memory in which aperture setting member information, indicating whether aperture setting member is provided to said first and second interchangeable lens (which is being) attached to said camera body, is stored.

10. An interchangeable lens having an automatic aperture control capability which can be detachably attached to a camera body, said interchangeable lens comprising:

an aperture ring by which an aperture value can be set; and a memory for storing lens information indicating that said interchangeable lens has said aperture ring.

11. An interchangeable lens having an automatic aperture control capability which can be detachably attached to a camera body, said interchangeable lens comprising:

a memory for storing lens information indicating that said interchangeable lens has no aperture ring by which an aperture value can be set.

* * * * *